Sept. 3, 1935. M. O. FROST ET AL 2,013,141
DISTRIBUTION SYSTEM FOR SHOE FACTORIES
Filed Jan. 9, 1933 5 Sheets-Sheet 1

FIG. I.

Sept. 3, 1935. M. O. FROST ET AL 2,013,141
DISTRIBUTION SYSTEM FOR SHOE FACTORIES
Filed Jan. 9, 1933 5 Sheets-Sheet 2

Myron O. Frost,
Peter Mattler,
Inventors.
Delos G. Haynes
Attorney

Sept. 3, 1935.    M. O. FROST ET AL    2,013,141
DISTRIBUTION SYSTEM FOR SHOE FACTORIES
Filed Jan. 9, 1933    5 Sheets-Sheet 3

Myron O. Frost,
Peter Mattler,
Inventors.
Delos G. Haynes
Attorney.

Sept. 3, 1935.  M. O. FROST ET AL  2,013,141
DISTRIBUTION SYSTEM FOR SHOE FACTORIES
Filed Jan. 9, 1933  5 Sheets-Sheet 4
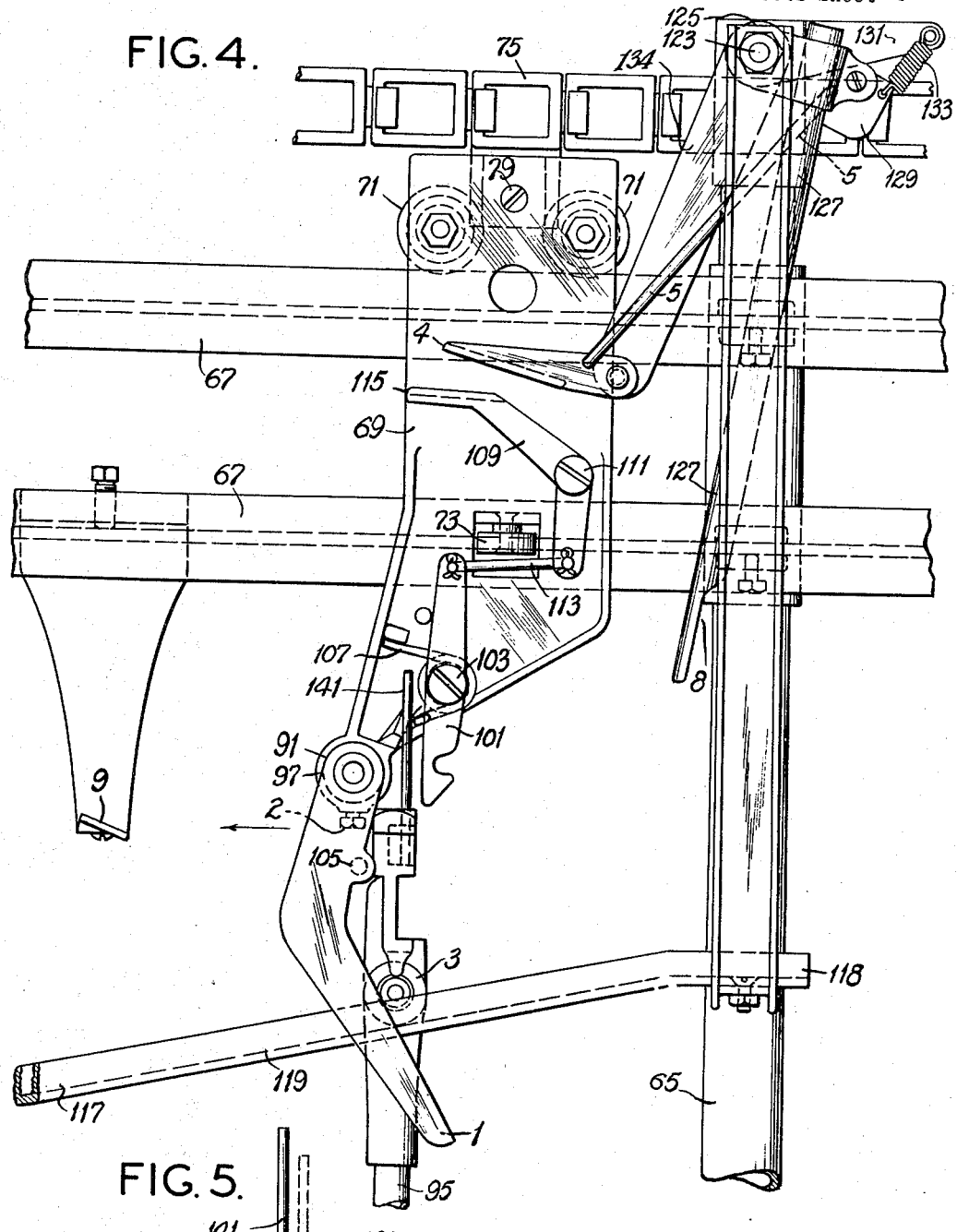
FIG. 4.
FIG. 5.
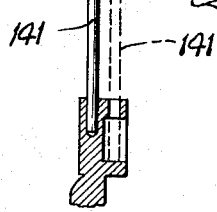
Myron O. Frost,
Peter Mattler,
Inventors.
Delos G. Haynes,
Attorney.

Sept. 3, 1935. M. O. FROST ET AL 2,013,141
DISTRIBUTION SYSTEM FOR SHOE FACTORIES
Filed Jan. 9, 1933 5 Sheets-Sheet 5
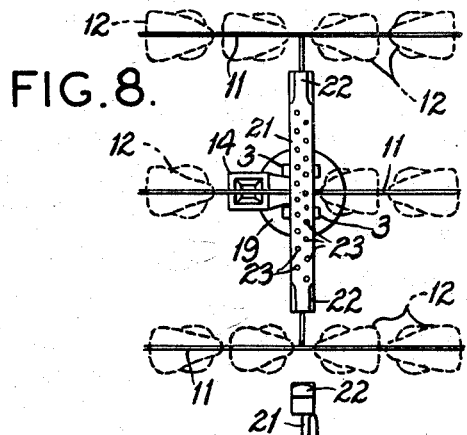
FIG. 8.
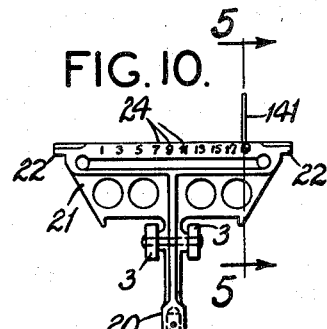
FIG. 10.
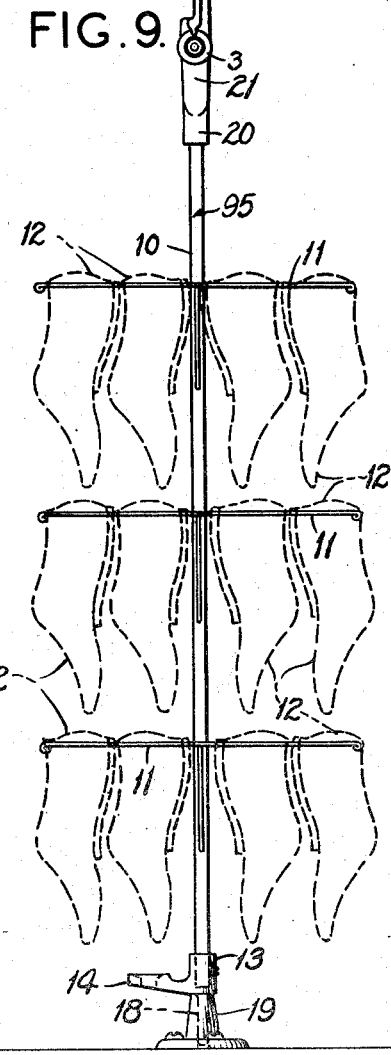
FIG. 9.
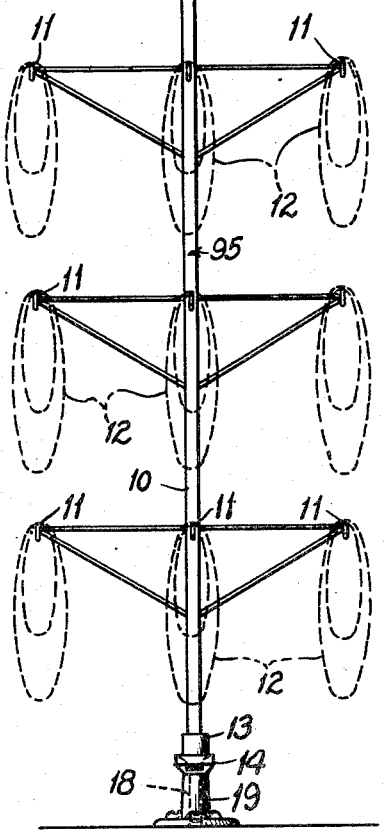
Myron O. Frost,
Peter Mattler,
Inventors.
Delos G. Haynes
Attorney.

Patented Sept. 3, 1935

2,013,141

UNITED STATES PATENT OFFICE 2,013,141

DISTRIBUTION SYSTEM FOR SHOE FACTORIES

Myron O. Frost, Richmond Heights, and Peter Mattler, St. Louis, Mo., assignors, by mesne assignments, to The Lamson Company, Syracuse, N. Y., a corporation of Massachusetts Application January 9, 1933, Serial No. 650,746

5 Claims. (Cl. 198—38)

This invention relates to distribution systems for shoe factories, and with regard to certain more specific features, to a selective distribution system.

This invention is an improvement upon the construction shown in our patent application, Serial Number 642,915, for Distribution system for shoe factory, filed November 16, 1932.

Among the several objects of the invention may be noted the provision of an improved, selective distribution system for shoe factories wherein a given operator may determine the manner of distribution according to the requirements of other operators or according to other variables; the provision of apparatus of the class described which shall, as distribution is effected, support articles such that circulation of air therethrough may take place and thus a drying, hardening or like operation for cement or the like may be accomplished during distribution; the provision of apparatus of the class described in which the article supports may be conveniently used as standards adjacent operators from which and to which work is moved; and the provision of simplified apparatus for carrying the above ends. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a general ground plan view of the invention;

Fig. 4 is a view similar to Fig. 3 showing a position of parts after release has been effected;

Fig. 5 is a fragmentary section, taken on line 5—5 of Fig. 10;

Fig. 8 is a plan view of a carrier tree, showing in dotted lines the application of articles thereto;

Fig. 9 is an end elevation of Fig. 8; and,

Fig. 10 is a side elevation of Fig. 8.

Similar reference characters indicate corresponding parts throughout the several views of the drawings.

Figure 1:
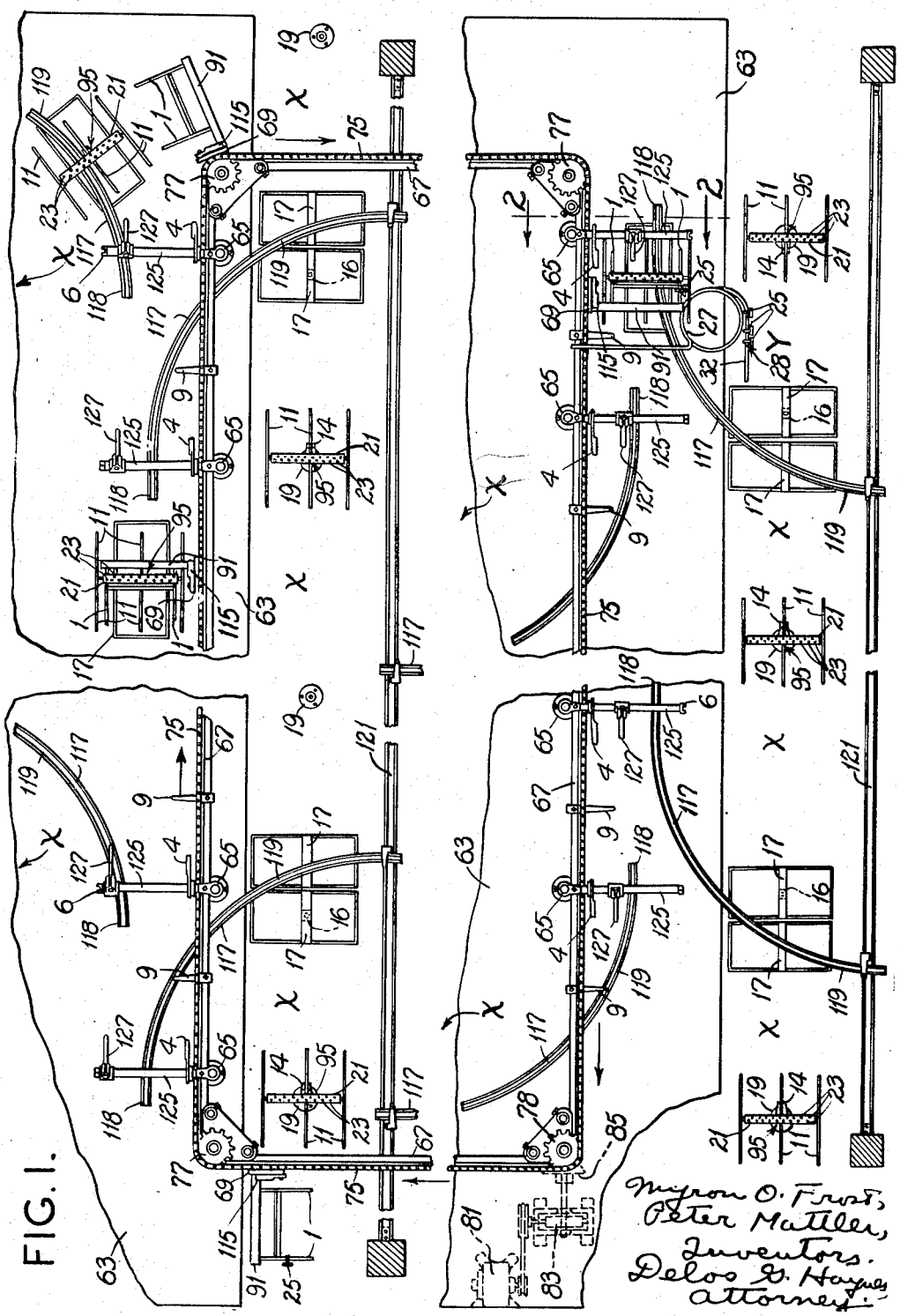

Referring now more particularly to Fig. 1, there are shown at numerals 63 tables about which shoe operators are seated at stations, such as at points X and Y, for example, said operators performing with or without machines or the like, operations in connection with the manufacture of shoes, such as for example, the assembling of various pieces to form uppers, liners or the like. The operators require to have material distributed to them and it is the purpose of this invention to effectively and efficiently make such distribution and simultaneously to effect drying and like operations, thereby to obtain an improved output with the expenditure of less time.

Uprights 65 are provided for supporting a pair of upper and lower rails 67, the latter functioning to support rolling carriages 69. The carriages 69 are gravitationally suspended from upper grooved wheels 71 engaging the upper rail and are prevented from swinging inwardly by horizontally arranged rollers 73 riding on the side of the lower rail.

The carriages 69 are driven by means of an endless chain 75, passing over corner sprockets 77, 78, said chain having attachments 79 with said carriages 69. A source of power 81 and a speed reducer 83 with suitable driving connections 85 to the corner sprocket 78 results in the chain 75 being driven around a circuit, thus drawing the carriages around said circuit along the rails 67.

Figure 2:
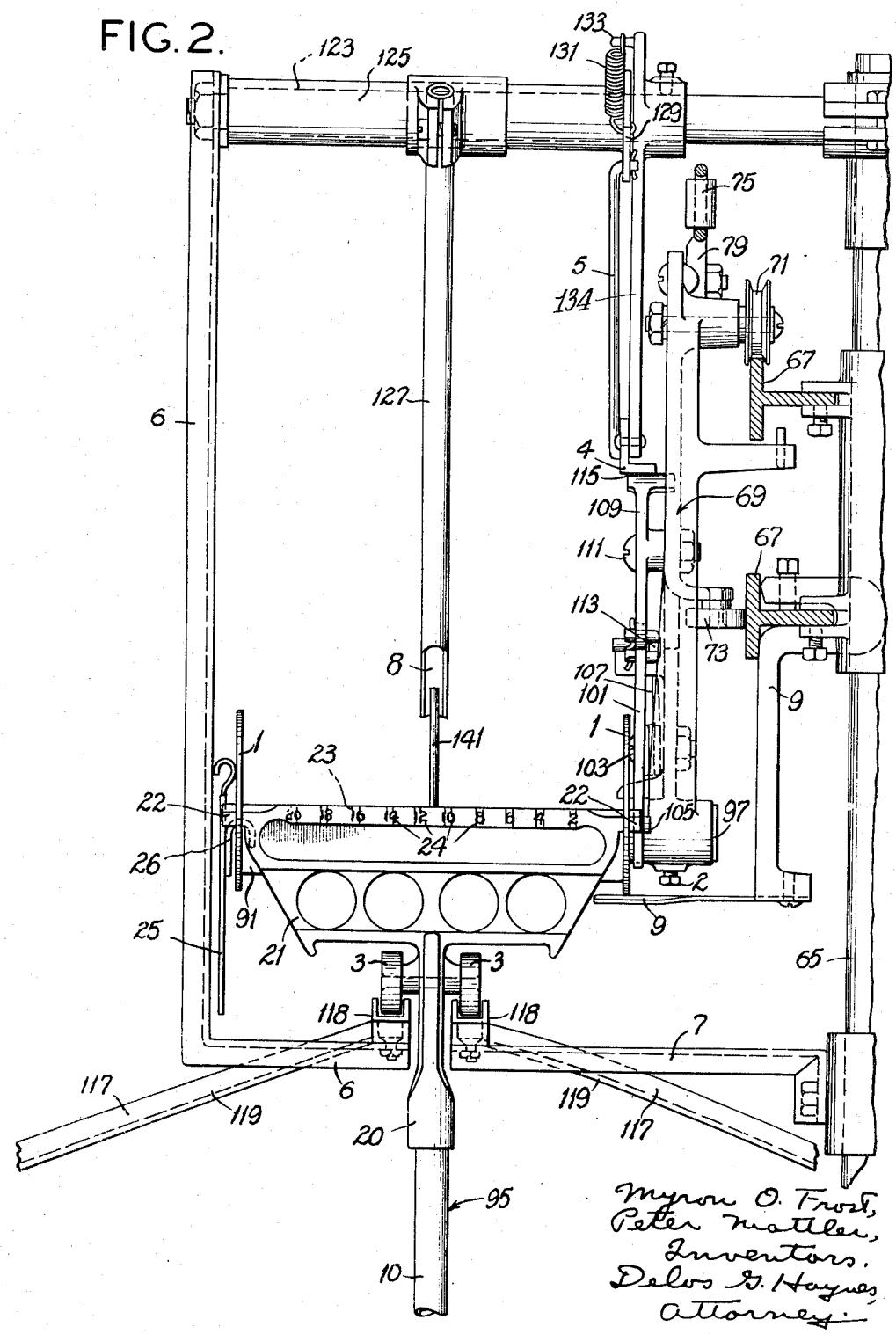
Fig. 2 is an end elevation of a releasing mechanism and is taken on line 2—2 of Fig. 1.
Figure 3:
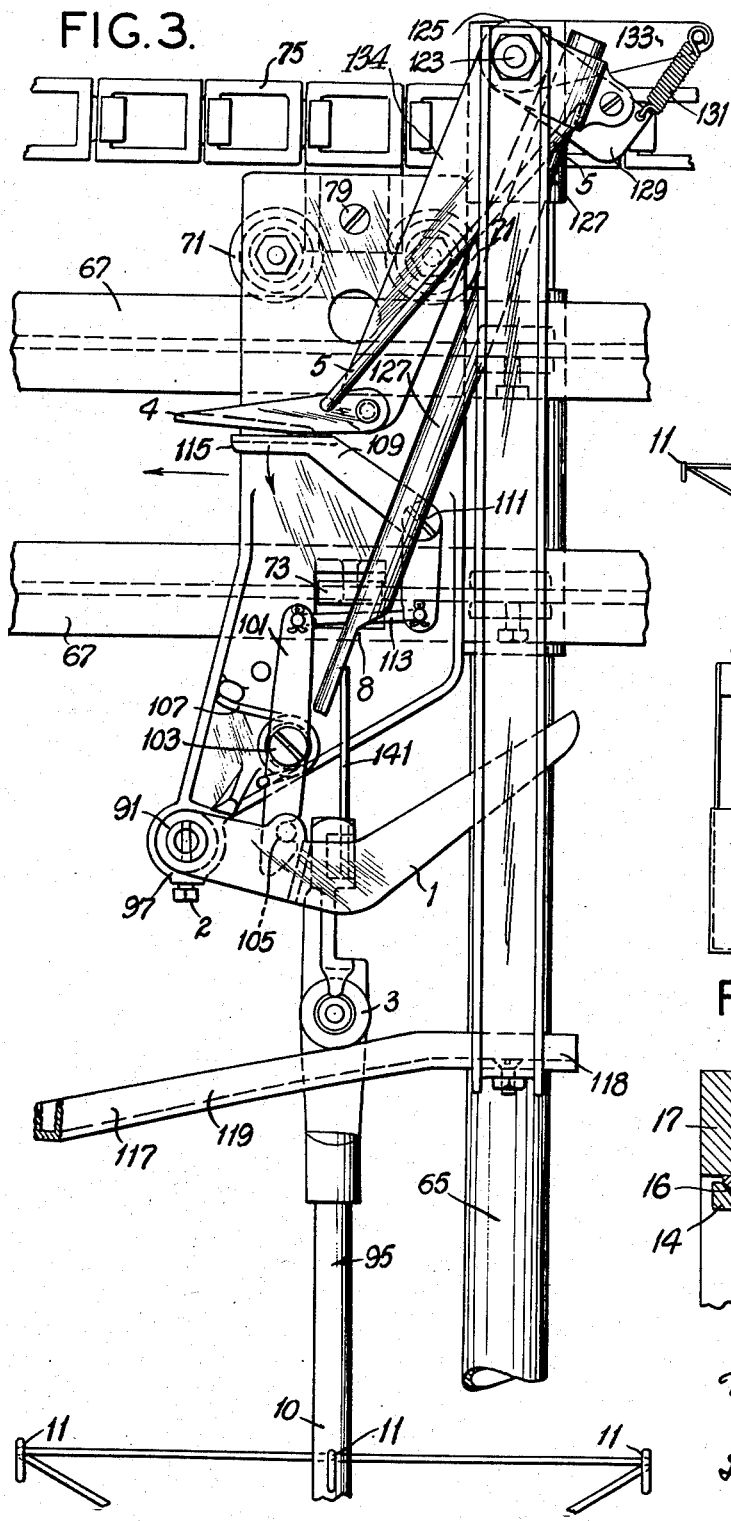
Fig. 3 is a side elevation of said releasing mechanism of Fig. 2, the same being shown in non-released position.

Referring to Figs. 2, 3 and 4, each carriage 69 rotatably supports a laterally extending and rotatable member 91 having rearwardly extending supporting hooks 1, the latter being spaced apart as shown in Fig. 2. Each member 91 is rotatably supported on an arm 97 held to the respective carriage 69 by a set screw 2. The rotatable member 91 is held up by a catch or latch 101 pivoted to the carriage at 103 and normally held to catch a lug 105 associated with the arms 1 and thus to hold said arms in upward position (Figs. 2 and 3). The normal holding action of the catch 101 is effected by a spring 107.

In order to cause the catch 101 to release the arms 1 to cause the arms to drop their load, there is provided a bell crank 109 pivoted at 111 to the respective carriage 69. This bell crank has a connection 113 with the catch 101 and has an extension 115.

At each point at which it is desired to separate a load from the arms 1, there is provided a channel chute 117 having an upper horizontal portion 118, a sloping portion 119 and a lower stop rail 121. The upper portion of the chute 117 is adapted to receive one of a pair of wheels 3 located on certain supporting trees 95. The chutes 117 are curved away from the general center line of travel of the carrier trees 95, the directions of curvature being either right or left to effect a distribution to points inwardly of the circuit of the chain 75 and outwardly thereof, as shown in Fig. 1. Operators may thus be accommodated around the tables 63, both inwardly and outwardly with respect to the travel loop of the chain. The ends of the chutes 117 which are directed outwardly of the loop are in alignment with the respective outer wheel 3 and the receiving ends of the chutes 117 which are directed inwardly are in line with the respective opposite and inward wheel 3.

In order to drop a carrier tree 95 from the arms 1 at suitable points, there is provided above the receiving end of each chute 117 a stationary horizontal rod 123 having a rotatable sleeve 125 upon which is attached a follower lever 127. Adjacently on the sleeve 125 is attached a lever 129, the lever 129 being adapted to be rotated by means of the sleeve 125 under the rotating action of the lever 127, that is to say, both the levers 127 and 129 rotate together with the sleeve 125.

A spring 131 reacting from a fixed arm 133 serves to normally draw up the arm 129. The arm 129 is connected with a pressure plate 4 by means of a connecting rod 5, whereby said pressure plate 4 is depressed upon clockwise rotation of the arms 127 and 129 (Figs. 3 and 4). The plate 4 is pivoted to a fixed arm 134. Depression of the plate 4 results in depression of the member 115 and release of the lug 105 by the catch 101.

As shown in Figs. 2, 3 and 4, each extension 123 also supports a member 6 for supporting the respective outside chute 117, and the standards 65 also support the respective member 7 for upholding the inner chute 117.

As shown in Fig. 2, each arm 127 comprises a hollow rod notched as shown at numeral 8, thereby providing a contact socket or recess. Each arm 127 is contacted by a selectively placed extension 141 from a carrier tree 95. Thus the pressure plate 4 contacts the piece 115 to rotate the bell crank 109 so as to cause said catch 101 to drop the arms 1 and hence release the carrier tree 95 (Fig. 4). The carrier tree 95 is released at a point such that its center of gravity is beyond the upper level portion 118 of the chute 117 and over the sloping portion 119, thus causing the tree to remain upright while descending to the lower stop 121 (Figs. 1 and 4). This is done on one only of its wheels 3.

After the carrier tree 95 has been dropped, the arms 1 return under the action of a subsequently placed spring lifting cam 9. The lift takes place as the carriage 69 moves to a point beyond the respective chutes 117. Thus the arms 1 raise and the catch 101 is caused, by means of the spring 107, to support the same for the next application of a carrier tree 95.

One of the features of this invention is the provision of the carrier trees 95 for carrying material to be distributed. Heretofore, baskets, boxes and the like had been used where it has been desired to convey a plurality of pieces at one time. These pieces were ordinarily heaped into the closed-up container. We have found that in the case of making distribution of articles such as herein contemplated, that such an old system is not satisfactory.

The articles herein contemplated comprise cemented or glued assemblies of upper or liner elements or the like which have been cemented and which consequently require to be dried. If distribution is upheld awaiting drying, unnecessary delay is introduced and floor space is consumed in laying the articles out or hanging them up to dry. On the other hand, if they are heaped in boxes, baskets or the like while moist, they tend to adhere to one another and must be subsequently torn apart. This results in delay, depreciation in appearance and an excessively slow rate of drying caused by the lack of air circulation in the containers.

It is not a satisfactory solution to the problem to provide a conveyor in which each unit or assembly of cementing material is hung on a separate traveling member, because this interrupts the sending and receiving operator's work too often, and this is especially undesirable where the operator's duties comprise a small fraction of the work to be done on a unit. Under such conditions the operation of the system consumes more time than the work desired to be done.

Our improvement consists in providing hangers or carrier trees such as illustrated per se in Figs. 5 to 10. Each tree 95 comprises a trunk 10 having branch arms 11 adapted to receive or to have hung or laid thereon the work assemblies 12. The lower ends of the trunks are provided with members 13 each having a lateral extension 14 and a recess 15 for receiving a projection 16 on the under side of the handle of a basket or the like 17. The member 15 also has a downwardly extending pin 18 for introduction into socket members 19 screwed to the floor at or near the operator's stations X.

Thus an operator receives a tree 95 from its support on the arms 1, takes it down from its position against the stop 121, sets the pin 18 in the respective socket 19 near her station and works on the assemblies 12 by removing them one by one from the tree, working thereon, and returning them after said working. When the operator has completed work on all of the assemblies 12 on a given tree and has returned them to the tree, the tree may be rehung upon a passing set of arms 1.

A preferred number of assembly units 12 on a given tree 95 is the number corresponding to one case of shoes. By having a case of a given class of articles on one tree, it is easier to maintain a proper check on the number of sizes, grades and styles of shoes passing through a factory. Furthermore, one operation of taking down a tree serves an operator for some time.

The formation of each tree 95 comprises a casting 20 at the upper end of the trunk 10 having a cross arm 21 accommodating two rows of holes 23 (Fig. 8). These rows of holes are for the selective receptions of the pins 141 (Figs. 2, 3 and 5), the pins 141 being set according to the respective arm 127 with which it is desired to have engagement effected, the arms 127 being predeterminately positioned at the respective stations X. The tree head 21 also has lateral lugs 22 which are cradled in the hollow portions of the arms 1, whereby the tree 95 as a whole is suspended. Indicia such as indicated at 24 are used adjacent the sockets 23 so as to indicate to the operator who sets the pins at what station the tree will be tripped off.

The operation of the invention is as follows:

The distributing operator is located at a station such as Y and receives material from elsewhere and may perform operations upon the material. As she completes her work, say upon a case of articles, she hangs them upon the carrier tree 95 which has been set up adjacent to her station. After she has filled the tree with the requisite number of articles, the tree is hung upon a passing pair of arms 1 which at this time are in the raised position shown in Figs. 2 and 3. Before she applies the tree to the arms, she affixes a pin 141 in the proper recess 23 corresponding to the station at which the tree is to be tripped off, as designated by the indicia 24.

At the predetermined station, the pin 141 contacts with the socket 8 of the arm 127, thus causing tripping off of the tree 95, in the manner hereinbefore described. The released tree descends, its proper anti-friction support wheel 3 dropping into a chute 117 and gravitationally descending to the stop 121. The operator at the respective station X takes down the tree and inserts the finger 18 (Fig. 7) into the socket 19 (Fig. 9). The socket being near her station, she now has a tree rack from which the articles may be taken and operated upon and then re-hung on the tree. When she has finished with the work on the tree of articles, she re-hangs the tree upon the arms 1, and at the same time properly sets the pin 141 for causing release of the tree at the next subsequent station upon which it is desired to operate upon the article, or at the final station where the trees are taken from the system.

When the receiving operator at the respective station X is about to become out of work, she indicates this fact to the distributing operator at station Y as follows: Said operator at the station X places a metal tag 25 having a hook 26 on a passing arm 1 (not necessarily the one upon which she re-hangs the tree 95; although it may be such, see Fig. 2). This tag 25 bears the number of the station of the respective operator. This tag thus travels around to the sending station Y where it is removed by a circular or helical stripper rod 21, down which it slides to a horizontal part 32. Thus the distributor operator Y obtains a series of the tags 25 at the bottom of the stripper, as indicated at 28. The related positions of the tags at point 28 indicate to the operator Y the order in which the receiving operators at X became out of work. Hence she supplies work to them in the same order, returning their respective tags by attaching said tags to the arms 1 upon which the returning tree 95 is mounted (Fig. 2).

It is to be understood that several operators may be working at a station such as X and all of them receive their work from a given tree. An operator at one station may remove or work upon a desired amount of material and then reset the pin 141 so that the tree 95 may go to the home station Y, or drop off at a next succeeding work station X, or drop off at a station from which articles are taken from the system.

Figure 6:
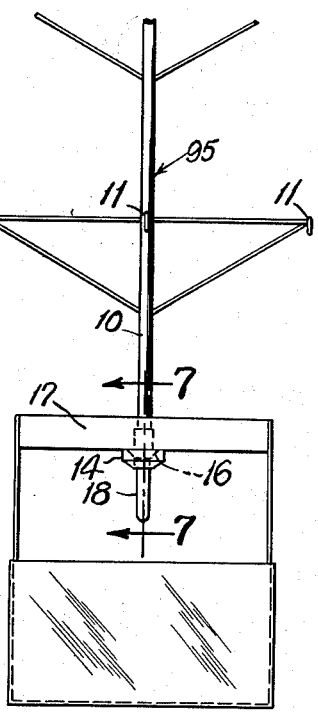
Fig. 6 is a fragmentary detail showing a method of attaching a basket to a carrier tree.
Figure 7:
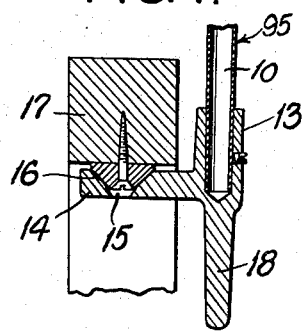
Fig. 7 is a fragmentary section taken on line 7—7 of Fig. 6.

It will be seen according to Figs. 6 and 7 that not only may the trees 95 be supported and transported, but that baskets 27 may be also carried by suspending them from the trees as indicated. Thus if an operator requires a batch of extraneous material for use in connection with her operations upon the material supported by the tree, and such material does not require drying, it may be carried in said basket 27. The basket may be retained or returned with the tree 95.

From the above it will be seen that selective distribution of work is carried out according to predetermined batches. The material worked upon may be of a nature requiring drying, hardening or the like and as such is individually supported. Furthermore, while being transported air is circulated around the individual pieces of material or assemblies thereof, thus causing them to become properly conditioned as they are transported. Hence two operations are carried on at the same time and with a better result, because the pieces of material do not mar one another in transit. Furthermore, provision is made for carrying pieces which do not require air circulation along with those that do. The carriage of an organized group of individually supported pieces facilitates tabulation and saves time and labor.

It will be understood that the individual pieces need not necessarily be hung upon the branches 11 of the tree 95 but that they may be laid crosswise thereon, as upon a grill. This would be the case where the pieces do not have an endless form such as shown. It is also to be understood that small individual boxes, such as cardboard shoe boxes may be supported on the arms 11 in conjunction with the pieces 12 which are supported; or said boxes may be supported alone in cases of emergency.

It is to be understood that the separation of work pieces on the trees 95 needs only to be substantially of an amount to permit of effective drying and that the pieces may touch at points where they will not deleteriously adhere to one another.

In view of the above, it will be seen that the several objects of the invention are achieved and other advantageous results attained.

As many changes could be made in carrying out the above constructions, without departing from the scope of the invention, it is intended that all matter contained in the above description or shown in the accompanying drawings shall be interpreted as illustrative and not in a limiting sense.

We claim:

1. In shoe machinery, a conveying means having predetermined stations therealong, releasable latch means, work supporting members adapted to be attached to the conveying means, means adapted to be attached to the work supporting members at predetermined positions, trip means at the respective stations adapted to operate said latch means, said attachable means on the work supporting means being adapted to affect the trip means to release the work supporting means, rollers on opposite sides of the work supporting means and gravity chutes on opposite sides of the work supporting means adapted to receive one or the other of said rollers upon release.

2. In shoe machinery, conveying means, a plurality of supporting arms on the conveying means, latch means adapted to hold up said arms, a T-shaped work support adapted to be cradled in said arms, said last-named means having a plurality of receiving means, extensions, one of which is adapted to be selectively attached at one of said receiving means, a plurality of trip means, one of which is adapted to be engaged by said extension to release the arms to release the work support, means for subsequently latching the arms upon continued movement thereof, and oppositely located take-off chutes located on opposite sides of said work supporting means adapted to carry said work supporting means in either of different directions with respect to the line of travel thereon.

3. In shoe machinery, a conveying means having a plurality of supporting arms, a latch for upholding said arms, releasing means for the latch located at intervals along the path of the conveying means, a T-shaped tree adapted to be suspended from arms, said tree having a plurality of recesses on the cross of the T, a pin adapted to be selectively positioned in said recesses and to selectively cooperate with said releasing means to release the tree from the arms, anti-friction supporting means on the tree, and chutes adapted to receive the supporting means and to convey the trees after release from the arms.

4. In shoe machinery, a conveying means having a plurality of supporting arms, a latch for upholding said arms, releasing means for the latch located at intervals along the path of the conveying means, a T-shaped tree adapted to be suspended from arms, said tree having a plurality of recesses on the cross of the T, a pin adapted to be selectively positioned in said recesses and to selectively cooperate with said releasing means to release the tree from the arms, anti-friction supporting means on the tree, and chutes adapted to receive the supporting means and to convey the trees after release from the arms, said tree having a plurality of lateral extending arms adapted to individually support a plurality of articles, and a downward extension on the tree adapted to be socketed to support the tree.

5. An apparatus of the class described having in combination, a movable conveyor, a work support comprising a trunk having branches on which pieces of work may be hung in spaced relation, means for suspending the work support from the conveyor in such manner as to maintain it upright and for disconnecting it from the conveyor at predetermined selected positions in its path of travel, a chute located below the conveyor at each of said predetermined positions, and a member carried by and located near the top of the work support adapted to be received in the chute when the work support is detached from the conveyor, to suspend the work support and guide it in its travel downward along the chute while maintaining said work support upright at all times, there being an extension on the work support adapted to be socketed in a stationary member to hold the work support upright while the pieces of work are being removed from it.

MYRON O. FROST.
PETER MATTLER.